US006918110B2

(12) United States Patent
Hundt et al.

(10) Patent No.: US 6,918,110 B2
(45) Date of Patent: Jul. 12, 2005

(54) DYNAMIC INSTRUMENTATION OF AN EXECUTABLE PROGRAM BY MEANS OF CAUSING A BREAKPOINT AT THE ENTRY POINT OF A FUNCTION AND PROVIDING INSTRUMENTATION CODE

(75) Inventors: Robert Hundt, Sunnyvale, CA (US); Vinodha Ramasamy, Santa Clara, CA (US); Eric Gouriou, Sunnyvale, CA (US); David J. Babcock, San Jose, CA (US); Thomas C. Lofgren, Sunnyvale, CA (US); Jose German Rivera, Sunnyvale, CA (US); Umesh Krishnaswamy, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 678 days.

(21) Appl. No.: 09/833,248

(22) Filed: Apr. 11, 2001

(65) Prior Publication Data

US 2002/0152455 A1 Oct. 17, 2002

(51) Int. Cl.[7] .................................................. G06F 9/45
(52) U.S. Cl. ..................................................... 717/158
(58) Field of Search ............................... 717/158, 157, 717/130, 131, 124, 127; 714/35, 38, 39, 48; 709/331; 702/182; 711/203

(56) References Cited

U.S. PATENT DOCUMENTS

| | | | | |
|---|---|---|---|---|
| 4,802,165 A | * | 1/1989 | Ream ............................ | 714/38 |
| 5,142,679 A | * | 8/1992 | Owaki et al. ................. | 717/151 |
| 5,161,216 A | * | 11/1992 | Reps et al. .................... | 717/151 |
| 5,175,856 A | * | 12/1992 | Van Dyke et al. ............ | 717/151 |
| 5,212,794 A | * | 5/1993 | Pettis et al. ................... | 717/153 |
| 5,307,498 A | * | 4/1994 | Eisen et al. ................... | 717/158 |
| 5,313,616 A | * | 5/1994 | Cline et al. ................... | 717/127 |
| 5,450,586 A | * | 9/1995 | Kuzara et al. ................ | 717/124 |
| 5,481,713 A | * | 1/1996 | Wetmore et al. ............. | 717/170 |
| 5,491,808 A | * | 2/1996 | Geist, Jr. ....................... | 711/100 |
| 5,577,244 A | * | 11/1996 | Killebrew et al. ............ | 717/169 |
| 5,613,118 A | * | 3/1997 | Heisch et al. ................. | 717/158 |
| 5,619,698 A | * | 4/1997 | Lillich et al. ................. | 717/168 |

(Continued)

OTHER PUBLICATIONS

IBM Technical Disclosure Bulletin, vol. 31, No. 1, Jun. 1988, pp. 294–298.*

Rewriting Executable Files to Measure Program Behavior, J.R. Larus et al, University of WI Tech Report 1083, pp. 1–17, Mar. 25, 1992.*

"Linkers and Loaders", John Levine, pp. 75–92, 216–222, Oct. 11, 1999.*

IBM Technical Disclosure Bulletin, Dual Indirect RAM/ ROM JUMP Tables For Fimware Updates, vol. 31, No. 1 Jun. 1988, pp. 294–298.*

Miller et al., *The Paradyn Parallel Performance Measurement Tools*, IEEE Computer 28, Nov. 11, 1995.

Srivastava, Amitabh, and Eustace, Alan, *ATOM A System for Building Customized Program Analysis Tools*. Digital Equipment Western Research Laboratory.

*Primary Examiner*—Todd Ingberg

(57) ABSTRACT

Method and apparatus for dynamic instrumentation of an executable application program. The application program includes a plurality of functions, each function having an entry point and an endpoint. When the application is executed, a shared memory segment is created for an instrumentation program and the application program. Upon initial invocation of the original functions in the application program, corresponding substitute functions are created in the shared memory segment, the substitute versions including instrumentation code. Thereafter, the substitute functions are executed in lieu of the original functions in the application program.

14 Claims, 5 Drawing Sheets

U.S. PATENT DOCUMENTS

| | | | | |
|---|---|---|---|---|
| 5,659,752 A | * | 8/1997 | Heisch et al. | 717/158 |
| 5,689,712 A | * | 11/1997 | Heisch | 717/130 |
| 5,752,038 A | * | 5/1998 | Blake et al. | 717/158 |
| 5,774,724 A | * | 6/1998 | Heisch | 717/129 |
| 5,784,275 A | * | 7/1998 | Sojoodi et al. | 700/86 |
| 5,838,976 A | * | 11/1998 | Summers | 717/130 |
| 5,857,105 A | * | 1/1999 | Ayers et al. | 717/144 |
| 5,889,999 A | * | 3/1999 | Breternitz et al. | 717/158 |
| 5,903,758 A | * | 5/1999 | Walker | 717/130 |
| 5,909,578 A | * | 6/1999 | Buzbee | 717/130 |
| 5,940,618 A | * | 8/1999 | Blandy et al. | 717/128 |
| 6,006,033 A | * | 12/1999 | Heisch | 717/158 |
| 6,088,525 A | * | 7/2000 | Peri | 717/150 |
| 6,113,652 A | * | 9/2000 | Lysik et al. | 717/170 |
| 6,149,318 A | * | 11/2000 | Chase et al. | 717/131 |
| 6,158,049 A | * | 12/2000 | Goodwin et al. | 717/158 |
| 6,161,218 A | * | 12/2000 | Taylor | 717/174 |
| 6,170,083 B1 | * | 1/2001 | Adl-Tabatabai | 717/158 |
| 6,175,956 B1 | * | 1/2001 | Hicks et al. | 717/114 |
| 6,189,141 B1 | * | 2/2001 | Benitez et al. | 717/153 |
| 6,202,205 B1 | * | 3/2001 | Saboff et al. | 717/151 |
| 6,216,237 B1 | * | 4/2001 | Klemm et al. | 714/38 |
| 6,230,316 B1 | * | 5/2001 | Nachenberg | 717/169 |
| 6,253,373 B1 | * | 6/2001 | Peri | 717/150 |
| 6,275,981 B1 | * | 8/2001 | Buzbee et al. | 717/158 |
| 6,282,707 B1 | * | 8/2001 | Isozaki | 717/157 |
| 6,295,644 B1 | * | 9/2001 | Hsu et al. | 717/158 |
| 6,298,481 B1 | * | 10/2001 | Kosaka et al. | 717/110 |
| 6,305,010 B2 | * | 10/2001 | Agarwal | 717/126 |
| 6,308,326 B1 | * | 10/2001 | Murphy et al. | 717/174 |
| 6,327,699 B1 | * | 12/2001 | Larus et al. | 717/128 |
| 6,327,704 B1 | * | 12/2001 | Mattson et al. | 717/153 |
| 6,397,382 B1 | * | 5/2002 | Dawson | 717/130 |
| 6,397,385 B1 | * | 5/2002 | Kravitz | 717/173 |
| 6,401,240 B1 | * | 6/2002 | Summers | 717/130 |
| 6,470,493 B1 | * | 10/2002 | Smith et al. | 717/130 |
| 6,662,359 B1 | * | 12/2003 | Berry et al. | 717/130 |
| 6,681,387 B1 | * | 1/2004 | Hwu et al. | 717/158 |

* cited by examiner

DYNAMIC INSTRUMENTATION OF AN EXECUTABLE PROGRAM BY MEANS OF CAUSING A BREAKPOINT AT THE ENTRY POINT OF A FUNCTION AND PROVIDING INSTRUMENTATION CODE

FIELD OF THE INVENTION

The present invention generally relates to techniques and tools for analysis of computer programs, and more particularly to instrumentation of a computer program during program execution.

BACKGROUND

Analysis of binary executable programs is performed to analyze program performance, verify correctness, and test correct runtime operation, for example. Some analyses are performed prior to runtime (static analysis), while other analyses are performed during runtime (dynamic analysis). For both static and dynamic analysis, however, the analysis is often performed at the function level.

The term, "function", refers to named sections of code that are callable in the source program and encompasses routines, procedures, methods and other similar constructs known to those skilled in the art. The functions in the source code are compiled into segments of executable code. For convenience, the segments of executable code that correspond to the functions in the source code are also referred to as "functions".

A function is a set of instructions beginning at an entry point and ending at an endpoint. The entry point is the address at which execution of the function begins as the target of a branch instruction. The endpoint is the instruction of the function from which control is returned to the point in the program at which the function was initiated. For functions having multiple entry points and/or multiple endpoints, the first entry point and the last endpoint define a function.

One category of analysis performed on executable programs is "instrumentation". Instrumentation is generally used to gather runtime characteristics of a program. For example, the number times that a function is executed while the application is executing is determined through instrumentation. While the information gathered through instrumentation may be extremely useful for purposes of enhancing program performance, the process of setting up a program for instrumentation can be time-consuming.

Present instrumentation techniques generally involve compilation and linking of the application program along with instrumentation code. For small applications, this may be a straightforward process. However, for large applications, which may encompass hundreds or thousands of modules, the compilation and linking process may be complicated and difficult to modify to enable or disable instrumentation given the amount of time required. Another factor that contributes to the inefficiency of instrumentation of large applications is that oftentimes instrumentation is desired for only a small number of all the functions in the application. Thus, a great deal of time is spent rebuilding the entire application for instrumentation when only small portion of the application is to be instrumented.

A system and method that address the aforementioned problems, as well as other related problems, are therefore desirable.

SUMMARY OF THE INVENTION

The present invention provides a method and apparatus for dynamic instrumentation of an executable application program. The application program includes a plurality of functions, each function having an entry point and an endpoint. When the application is executed, a shared memory segment is created for an instrumentation program and the application program. Upon initial invocation of the original functions in the application program, corresponding substitute functions are created in the shared memory segment, the substitute versions including instrumentation code. Thereafter, the substitute functions are executed in lieu of the original functions in the application program.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

Dynamic instrumentation refers obtaining instrumentation data for an executable program (also, "executable application" or "application") while the program is executing without any pre-processing, for example, recompilation or relinking, of the application prior to execution. Thus, the same executable program that is used in a production environment is executed and instrumented. The present invention, as illustrated by the various embodiments described herein, performs dynamic instrumentation of an executable application. The dynamic instrumentation is performed by creating instrumented versions of functions when the functions are invoked, and thereafter executing the instrumented functions instead of the original functions.

Figure 1:
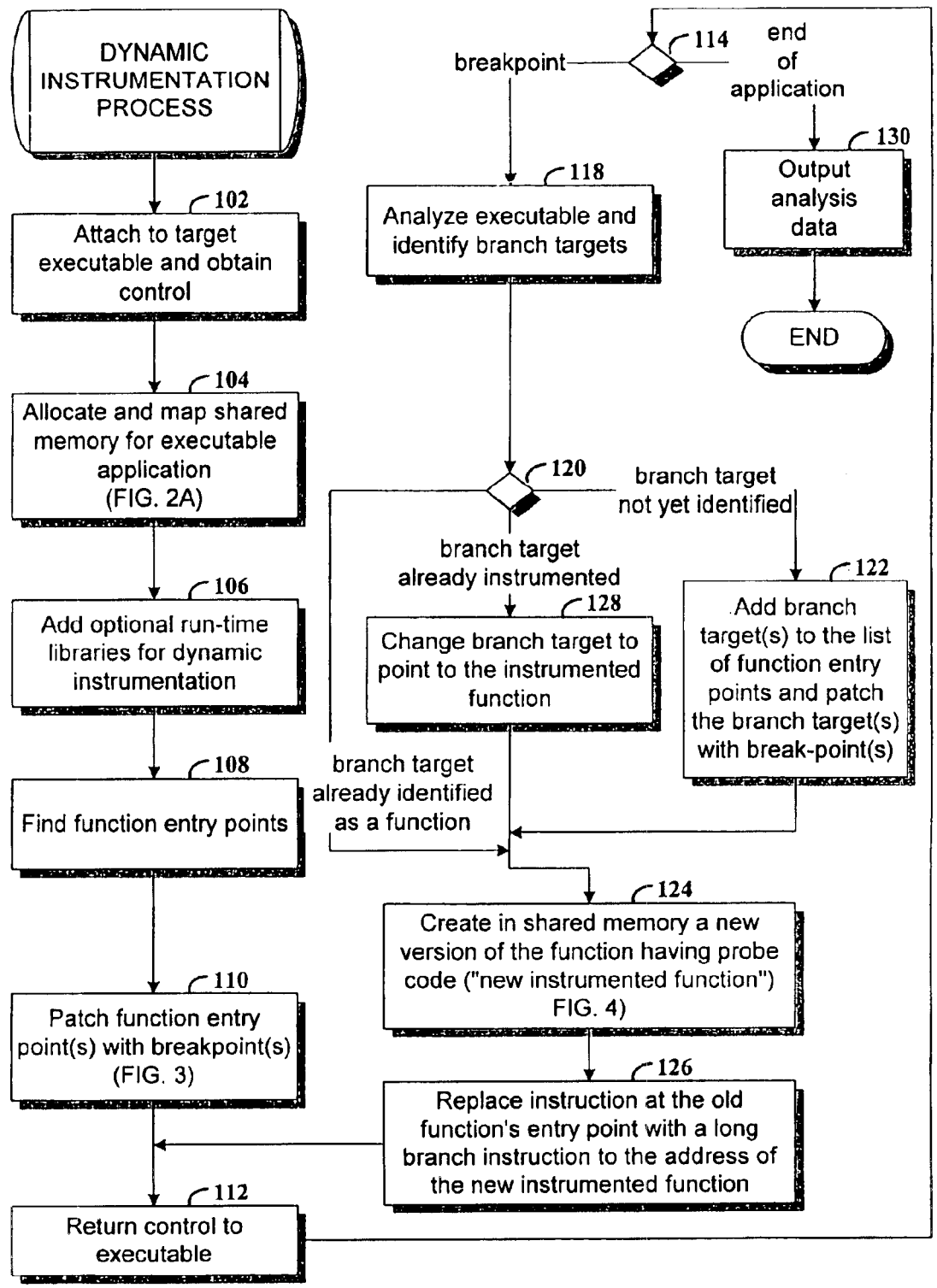
FIG. 1 is a flowchart of a process for performing dynamic instrumentation in accordance with one embodiment of the invention.

FIG. 1 is a flowchart of a process for performing dynamic instrumentation in accordance with one embodiment of the invention. The process generally entails generating instrumented functions from functions called during execution of the executable application and executing the instrumented functions instead of the original functions in the application. Thus, only those functions that are executed are instrumented, which is especially useful for instrumentation of large-scale applications.

At step 102, an instrumentation process attaches to a target executable application and obtains control. Those skilled in the art will appreciate that this step is accomplished using known, conventional techniques. At step 104, the process allocates and maps shared memory for use by the instrumentation process and the executable application. The process of allocating and mapping the shared memory is described further in FIG. 2A.

At step 106, optional run-time libraries are added for dynamic instrumentation.

These run-time libraries include, for example, code to dynamically increment the number of counters for indirect branch targets and code to perform a system call to register an instrumented function to the dynamic loader.

At step 108, entry points of the functions in the executable application are located. In addition to those methods that are known in the art, various other techniques for finding function entry points are described in the patent/application entitled, "ANALYSIS OF EXECUTABLE PROGRAM CODE USING COMPILER-GENERATED FUNCTION ENTRY POINTS AND ENDPOINTS WITH OTHER SOURCES OF FUNCTION ENTRY POINTS AND ENDPOINTS", to Hundt et al., filed concurrent herewith, having patent/application Ser. No. 09/833,299, the contents of which are incorporated herein by reference.

Each of the function entry points is patched with a breakpoint at step 110. The instructions at the function entry points are saved in a table so that they can be restored at the appropriate time. At step 112, control is returned to the executable application.

When a breakpoint is encountered in the executable application, control is returned to the instrumentation process, and decision step 114 directs the process to step 118. Step 118 analyzes the executable, finds the function entry point for the break that was hit, determines the length of the function, and analyzes the function to identify target addresses of branch instructions ("branch targets"). For newly identified branch target(s), the process is directed to step 122, where the branch target(s) is added to the list of function entry points, and the instruction at the branch target is patched with a break-point. The instruction at the branch target is first saved, however, for subsequent restoration. The process is then directed to step 124.

At step 124, a new instrumented function is generated and stored in the shared memory. The function of the executable application from which the new instrumented function is generated is that from which control was returned to the instrumentation process via the breakpoint (decision point 114). In generating the new instrumented function, the saved entry point instruction is restored as the first instruction of the new instrumented function in the shared memory. At step 126, the entry point instruction in the executable application is replaced with a long branch instruction having as a target the new instrumented function in the share memory. The instrumentation process then continues at step 112 where control is returned to the executable application to execute the new instrumented function.

Returning now to decision point 120, if the branch target (s) identified at step 118 has already been instrumented, the branch target is replaced with the address in shared memory of the instrumented function. If the branch instruction is subsequently executed, control will jump to the instrumented function. The instrumentation process then continues at step 124 as described above.

For branch targets that have already been identified as functions, the process continues from decision point 120 directly to step 124.

Returning now to decision point 114, when the end of the executable application is reached, control is returned to the instrumentation process, and the instrumentation process continues at step 130. Selected instrumentation data that were gathered in executing the application are output at step 130 to complete the instrumentation process.

Figure 2A:
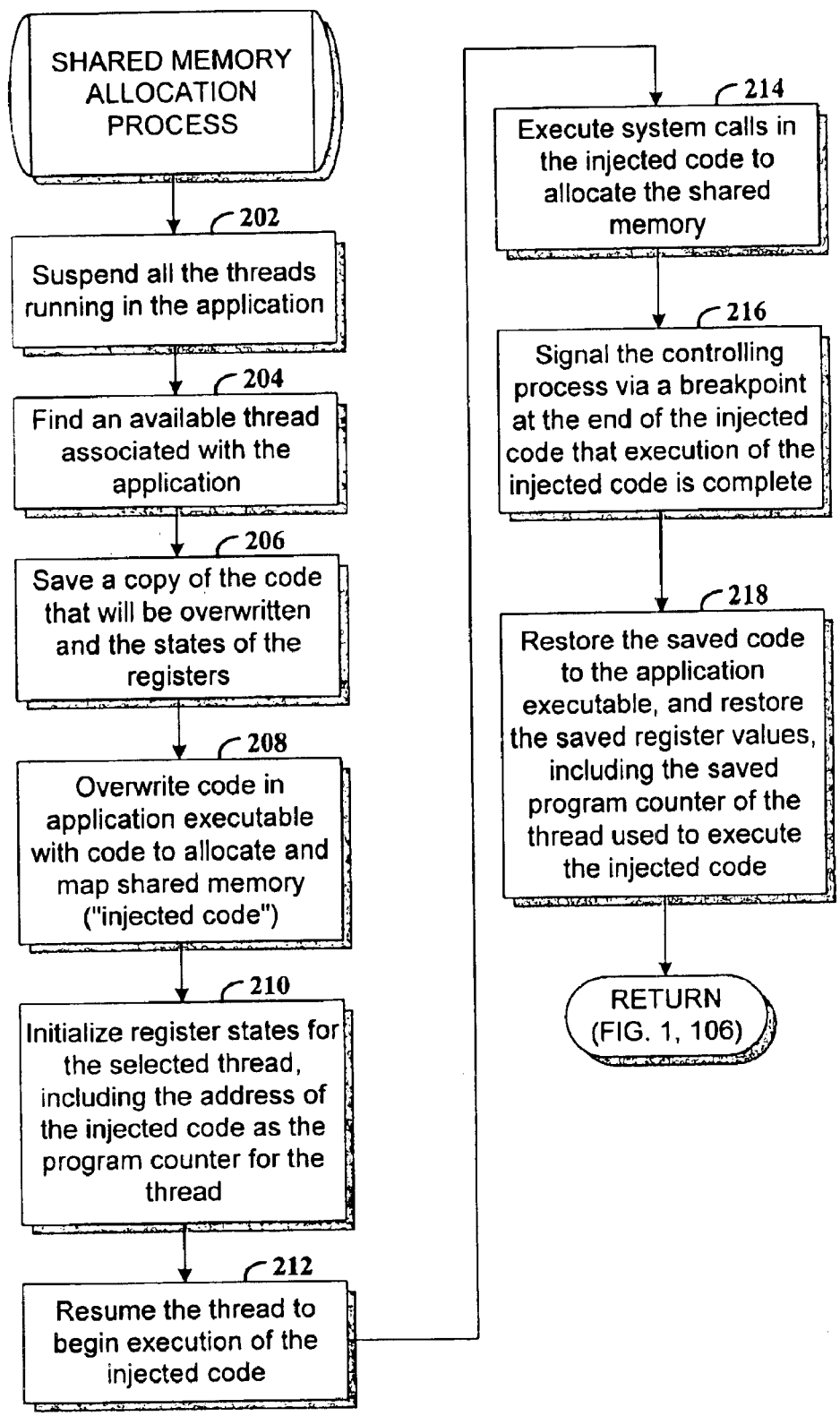
FIG. 2A is a flowchart of a process for allocating shared memory for the instrumentation process and the application executable.
Figure 2B:
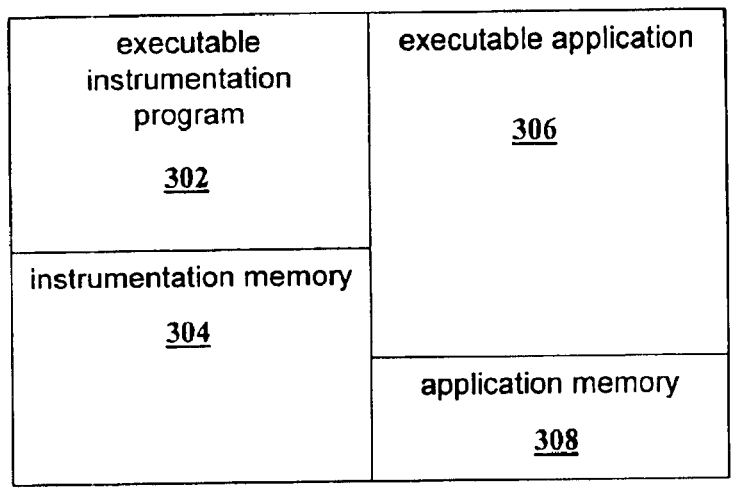
FIGS. 2B, 2C, and 2D illustrate a sequence of memory states resulting from the process of allocating the shared memory.
Figure 2C:
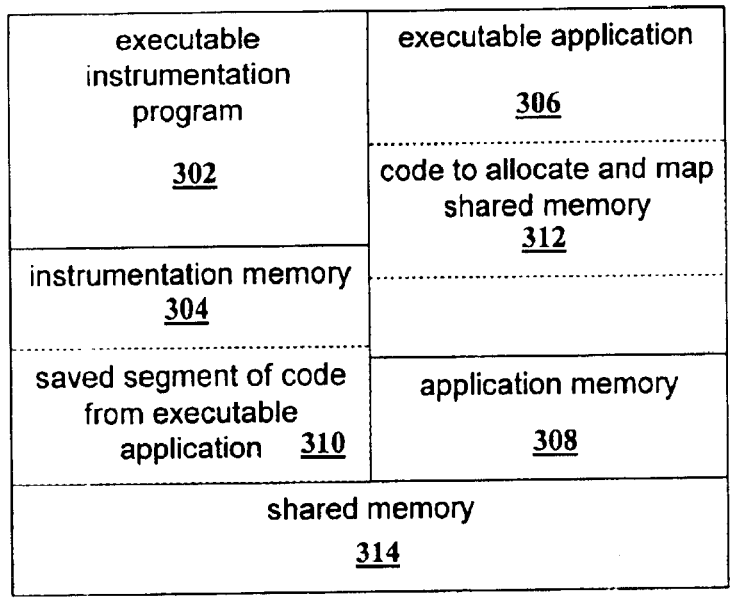
Figure 2D:
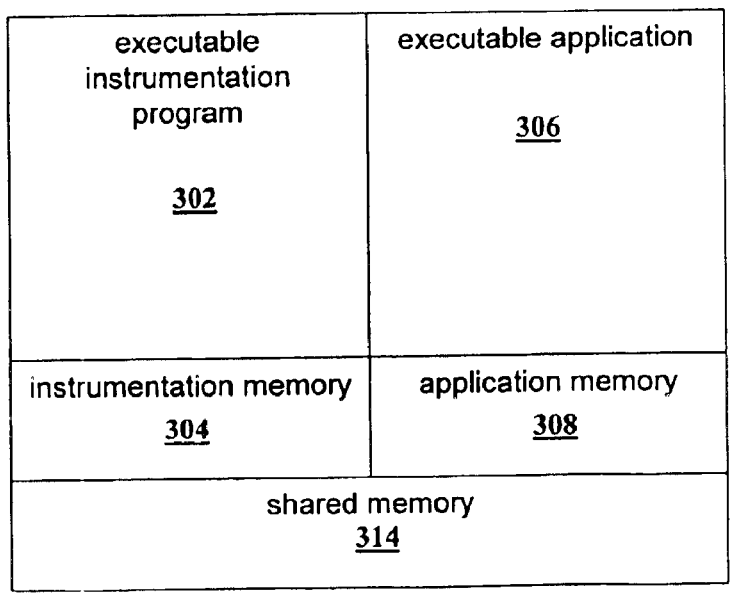

FIG. 2A is a flowchart of a process for allocating shared memory for the instrumentation process and the application executable. FIGS. 2B, 2C, and 2D illustrate a sequence of memory states resulting from the process of allocating the shared memory. Thus, references are made to the elements of FIGS. 2B, 2C, and 2D in the description of FIG. 2A.

Initially, the executable instrumentation program 302 (FIG. 2B) has a memory segment 308, and application executable has memory segment 306. At step 202, all threads of the executable application are suspended. At step 204, an available thread is selected from the application. A thread is unavailable if it is in the midst of processing a system call. If no threads are available, then all the threads are restarted, and the application is allowed to continue to execute until one of the threads returns from a system call. When a thread returns from a system call, the threads are again suspended, and the available thread is selected.

At step 206, the process selects a segment of code within the executable application and saves a copy of the segment 310 in instrumentation memory 304. In addition, the states of registers of the application are saved in instrumentation memory segment 304.

At step 208, the selected segment of code in the application is overwritten with code segment 312 ("injected code"), which includes instructions to allocate and map shared memory (FIG. 2C). At step 210, the registers are initialized for use by the selected thread, and the beginning address of the code segment 312 is stored in the program counter. At step 212, the execution of the thread is resumed at the code segment 312.

In executing code segment 312, system calls are executed (step 214) to allocate the shared memory segment 314 and map the shared memory segment for use by the executable instrumentation program 302 and the executable application 306. A breakpoint at the end of the injected code 312 signals (step 216) the executable instrumentation program 302 that execution of the injected code is complete.

A step 218, the executable instrumentation program 302 restores the saved copy of code 310 to the executable application 302 (FIG. 2D) and restores the saved register values. The saved program counter is restored for the thread used to execute the injected code. Control is then returned to step 106 of FIG. 1.

Figure 3:
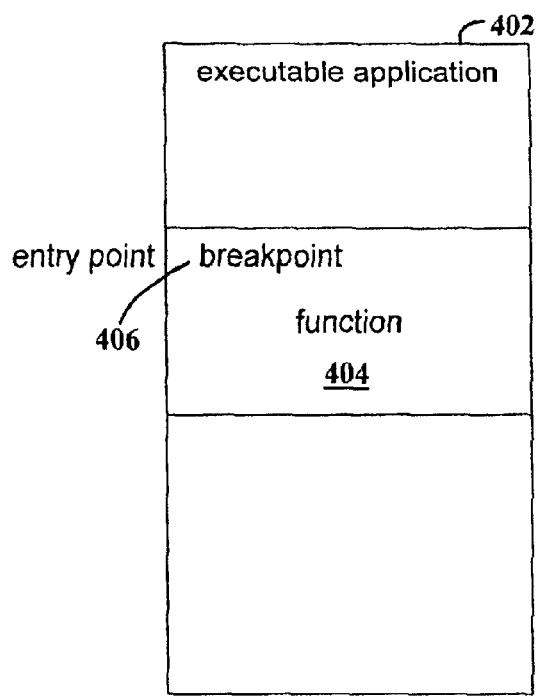
FIG. 3 is a block diagram that illustrates the functional layout of memory of an executable application which has a function entry point patched with a breakpoint.
Figure 4:
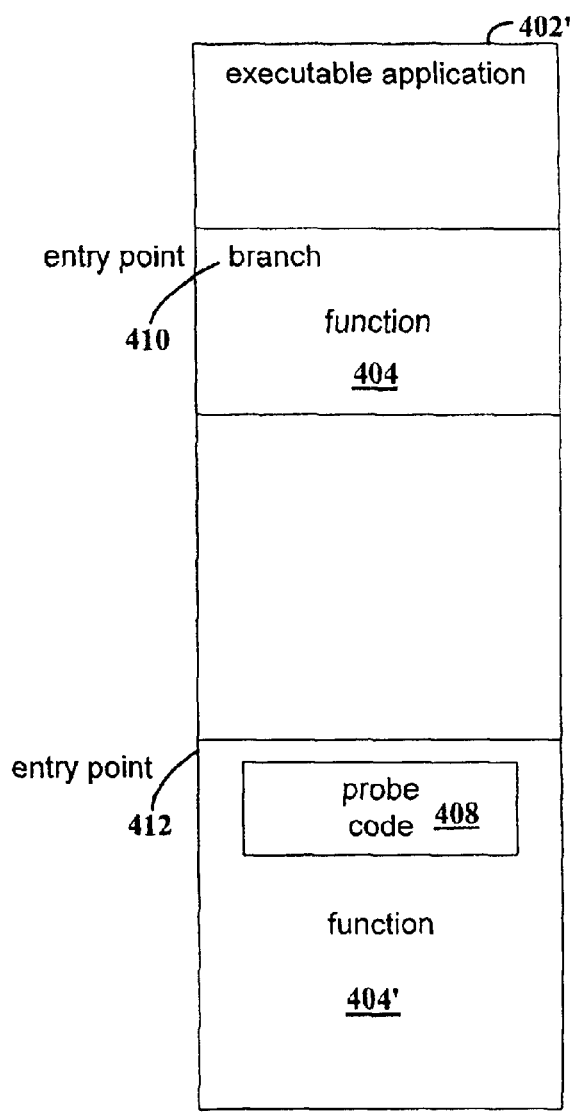
FIG. 4 is a block diagram that illustrates the functional layout of memory of an executable application after an instrumented version of a function has been created.

FIGS. 3 and 4 are block diagrams that illustrate the functional layout of memory used by an executable application during the instrumentation process. As shown and described in the process of FIG. 1 (step 108–110), the entry points of the functions in the executable application 402 are patched with breakpoints. For example, the entry point of function 404 is patched with breakpoint 406. When the breakpoint is encountered in executing the application 402, a new instrumented version of function 404 is generated (FIG. 1, steps 124 and 126).

The new executable application 402' (FIG. 4) includes the instrumented version of the function 404', which is stored in the shared memory segment 314 (FIG. 2D). The instrumented function 404' includes probe code 408, which when executed within function 404' generates selected instrumentation data. For example, the probe code 408 counts the number of times the function 404' is executed. It will be appreciated that the program logic originally set forth in function 404 is preserved in function 404'.

In order to execute the instrumented function 404', the instruction at the entry point of function 404 is replaced with a long branch instruction 410 having as a target address the entry point 412 of instrumented function 404'. In addition, the target addresses of branch instructions elsewhere in the application 402' that target function 404 are changed to reference instrumented function 404'.

Figure 5:
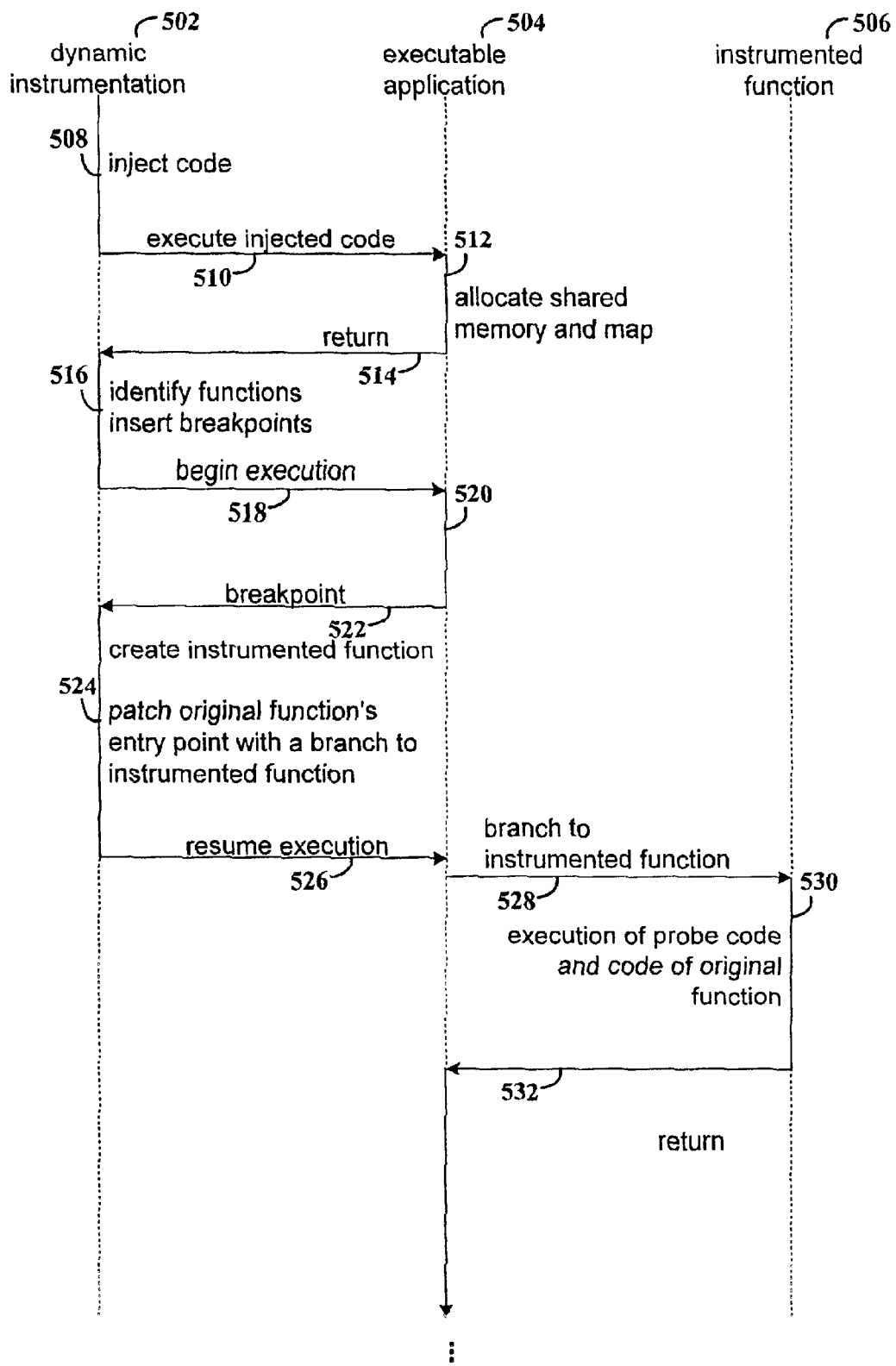
FIG. 5 is a control flow diagram that illustrates the interaction between a process that controls dynamic instrumentation, an executable application, and an instrumented function.

FIG. 5 is a control flow diagram that illustrates the interaction between the process that controls dynamic instrumentation 502, the executable application 504, and the instrumented function 506. The vertical portions of the directional lines represent execution of code indicated by the header above the vertical line. The horizontal portions indicate a transfer of control from one set of code to another set of code.

The control flow begins with the dynamic instrumentation code injecting code (508) into the executable application 504 (e.g., FIG. 2C). Control is transferred (510) from the dynamic instrumentation code to the executable application code to execute the injected code. The executable application 504 allocates and maps (512) shared memory for use by the dynamic instrumentation and the executable application. Control returns (514) to the dynamic instrumentation code, which then identifies functions in the executable application 504 and inserts breakpoints (516).

Control is then transferred (518) to the executable application, which executes the application code (520) until a breakpoint is reached. The breakpoint indicates the beginning of a function. The breakpoint transfers control (522) back the dynamic instrumentation code, and the dynamic instrumentation code creates an instrumented version of the function (FIG. 4) and patches the original function entry point with a branch to the instrumented function. Execution of the application 504 is then resumed (526) with an immediate branch (528) to the instrumented function 506.

The code of the instrumented function along with the probe code (FIG. 4, 408) is executed (530). Control is eventually returned (532) to execute other code in the application. The over all process then continues as described above with reference to FIG. 1.

Other aspects and embodiments of the present invention, in addition to those described above, will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for dynamic instrumentation of an executable application program using an instrumentation program, the application program including a plurality of original functions, each original function having an entry point and an endpoint, comprising:

patching the function entry points with breakpoint instructions;

creating a shared memory segment for the instrumentation program and the application program;

upon initial invocation of the original functions in the application program and in response to encountering the breakpoint instructions, creating in the shared memory segment corresponding substitute functions including instrumentation code; and executing the substitute functions in lieu of the original functions in the application program.

2. The method of claim 1, further comprising replacing the break instruction at the entry points of the functions in the application program with branch instructions that target the substitute functions.

3. The method of claim 2, wherein the executable application program includes one or more branch instructions having target addresses that reference entry points of one or more of the original functions, further comprising:

after creating a substitute function corresponding to an original function, for a branch instruction that references the original function replacing the target addresses to reference the substitute function.

4. The method of claim 2, wherein the executable application program is stored in memory and includes one or more branch instructions having associated target addresses that reference entry paints of one or more of the original functions in the memory, further comprising:

after creating a substitute function corresponding to an original function, for each branch instruction that references the original function in memory, replacing, in the application program stored in the memory, the associated target address with an address that references the substitute function.

5. The method of claim 1, wherein the executable application program includes one or more branch instructions having target addresses that reference entry points of one or more of the original functions, further comprising:

after creating a substitute function corresponding to an original function, for a branch instruction that references the original function replacing the target addresses to reference the substitute function.

6. The method of claim 1, further comprising:

copying a segment of the executable application program to selected area of memory by the instrumentation program;

replacing the segment of the application program with code that allocates the shared memory by the instrumentation program;

executing the code in the application program that allocates the shared memory segment; and restoring the segment of the executable application from the selected area of memory to the application program by the instrumentation program after the shared memory is allocated.

7. The method of claim 6, further comprising replacing the break instruction at the entry points of the functions in the application program with branch instructions that target the substitute functions.

8. The method of claim 7, wherein the executable application program includes one or more branch instructions having target addresses that reference entry points of one or more of the original functions, further comprising:

after creating a substitute function corresponding to an original function, for a branch instruction that references the original function replacing the target addresses to reference the substitute function.

9. The method of claim 6, wherein the executable application program includes one or more branch instructions having target addresses that reference entry points of one or more of the original functions, further comprising:

after creating a substitute function corresponding to an original function, for a branch instruction that references the original function replacing the target addresses to reference the substitute function.

10. The method of claim 6, wherein the executable application program includes a plurality of threads and further comprising:

before the step of copying the segment of the executable application program suspending all threads of the executable application program, and selecting one of the suspended threads; and after replacing the segment of the executable application program with the code that allocates the shared memory, resuming execution of the one of the suspended threads at the code that allocates the shared memory.

11. The method of claim 10, further comprising replacing the break instruction at the entry points of the functions in the application program with branch instructions that target the substitute functions.

12. The method of claim 11, wherein the executable application program includes one or more branch instructions having target addresses that reference entry points of one or more of the original functions, further comprising:

after creating a substitute function corresponding to an original function, for a branch instruction that references the original function replacing the target addresses to reference the substitute function.

13. The method of claim 1, wherein the executable application program is stored in memory and includes one or more branch instructions having associated target addresses that reference entry points of one or more of the original functions in the memory, further comprising:

after creating a substitute function corresponding to an original function, for each branch instruction that references the original function in memory, replacing, in the application program stored in the memory, the associated target address with an address that references the substitute function.

14. An apparatus for dynamic instrumentation of an executable application program by an instrumentation program, the application program including a plurality of original functions, each original function having an entry point and an endpoint, comprising:

means for patching the function entry points with breakpoint instructions;

means for creating a shared memory segment for the instrumentation program and the application program;

means for creating in the shared memory segment corresponding substitute functions including instrumentation code upon initial invocation of the original functions in the application program and in response to encountering the breakpoint instructions; and means for executing the substitute functions in lieu of the original functions in the application program.

* * * * *